United States Patent
Ando

(10) Patent No.: US 8,267,051 B2
(45) Date of Patent: Sep. 18, 2012

(54) WATER HEATER

(75) Inventor: Masakazu Ando, Nagoya (JP)

(73) Assignee: Rinnai Corporation, Nagoya-shi (JP)

( * ) Notice: Subject to any disclaimer, the term of this patent is extended or adjusted under 35 U.S.C. 154(b) by 952 days.

(21) Appl. No.: 12/330,913

(22) Filed: Dec. 9, 2008

(65) Prior Publication Data

US 2009/0151654 A1     Jun. 18, 2009

(30) Foreign Application Priority Data

Dec. 12, 2007 (JP) ................................. 2007-320459

(51) Int. Cl.
*F22B 5/00* (2006.01)

(52) U.S. Cl. ................. 122/18.1; 122/14.31; 122/406.1; 237/19

(58) Field of Classification Search .................. 122/14.2, 122/14.31, 18.1, 32, 33, 406.1, 448.1, 448.2, 122/448.3; 237/2 A, 8 A, 8 R, 19; 236/11
See application file for complete search history.

(56) References Cited

U.S. PATENT DOCUMENTS

| 6,606,968 B2 * | 8/2003 | Iwama et al. ................. 122/18.1 |
| 7,322,532 B2 * | 1/2008 | Takada et al. .................... 236/11 |
| 7,597,066 B2 * | 10/2009 | Shimada et al. ............. 122/18.1 |
| 7,628,123 B2 * | 12/2009 | Inami et al. ................. 122/448.3 |
| 7,647,897 B2 * | 1/2010 | Ootomo et al. .................. 122/33 |
| 2009/0151654 A1 * | 6/2009 | Ando ........................... 122/19.2 |

FOREIGN PATENT DOCUMENTS

| JP | 11-294761 | 10/1999 |
| JP | 2000-220824 | 8/2000 |
| JP | 2002-031333 | 1/2002 |
| JP | 2002-081618 | 3/2002 |

* cited by examiner

*Primary Examiner* — Gregory A Wilson
(74) *Attorney, Agent, or Firm* — Rankin, Hill & Clark LLP

(57) ABSTRACT

There is provided an indoor mounting water heater in which combustion exhaust gas is discharged to the outdoors via an exhaust duct, wherein a decrease in draft force caused when the number of burner groups to be burned is reduced by a capacity changeover mechanism to decrease the combustion capacity can be prevented, and the heat efficiency can be improved. An air supply chamber 81 is divided into a plurality of parts 82 and 83 corresponding to a plurality of burner groups 51 and 52. The air sent from an air supply fan 84 is supplied to only a part of the air supply chamber corresponding to a burning burner group.

7 Claims, 2 Drawing Sheets

WATER HEATER

BACKGROUND OF THE INVENTION

1. Field of the Invention

The present invention relates to an indoor mounting water heater in which combustion exhaust gas is discharged to the outdoors via an exhaust duct.

2. Description of the Related Art

Conventionally, there has been known a water heater comprising a combustion housing having an exhaust opening at the upper end thereof, a burner unit which is stored in the lower part of the combustion housing and configured by a plurality of burner groups, a heat exchanger for hot water supply which is stored in the upper part of the combustion housing, an air supply fan for supplying combustion air to the burner unit via an air supply chamber provided on the lower side of the arrangement section of burner unit in the combustion housing, and a capacity changeover mechanism for changing over the combustion capacity by changing the number of burner groups to be burned (for example, refer to Japanese Patent Laid-Open No. 11-294761).

In the case where the above-described water heater is used indoors by connecting the exhaust opening of the water heater to an exhaust duct already provided in a house or the like, if the gastightness of the exhaust duct is low, combustion exhaust gas may leak from an intermediate portion of the exhaust duct. If the exhaust duct is replaced with a high gastight duct, there arises no problem. However, the replacement of exhaust duct requires large-scale construction work, which results in an increase in cost. Therefore, to prevent the combustion exhaust gas from leaking even if the existing low gastight exhaust duct is used, it is necessary to increase the temperature of combustion exhaust gas of the water heater to make the draft force strong.

If the combustion capacity is decreased by the capacity changeover mechanism, some of the air supplied from the air supply fan passes through a non-burning burner group and is mixed with the combustion exhaust gas of a burning burner group in the upper part of the combustion housing, by which the temperature of combustion exhaust gas is decreased. Therefore, to maintain a strong draft force by increasing the temperature of combustion exhaust gas, the combustion capacity must always be kept in a high state by the capacity changeover mechanism. However, there arises a problem in that hot water is difficult to be supplied at a low set temperature.

Also, in the conventional water heater, if the combustion capacity is decreased by the capacity changeover mechanism, some of the air supplied from the air supply fan passes through a non-burning burner group and absorbs heat from the heat exchanger, which presents a problem of decreased heat efficiency.

SUMMARY OF THE INVENTION

The present invention has been made in view of the above circumstances, and accordingly an object thereof is to provide a water heater in which the draft force at the time when the combustion capacity is decreased by the capacity changeover mechanism can be prevented from decreasing, and also the heat efficiency can be improved.

To achieve the above object, the present invention provides a water heater comprising a combustion housing having an exhaust opening at the upper end thereof, which is connected to an exhaust duct extending to the outdoors; a burner unit which is stored in the lower part of the combustion housing and made up of a plurality of burner groups; a heat exchanger for hot water supply which is stored in the upper part of the combustion housing; an air supply fan for supplying combustion air to the burner unit via an air supply chamber provided on the lower side of the arrangement section of the burner unit in the combustion housing; and a capacity changeover mechanism for changing over the combustion capacity by changing the number of burner groups to be burned, wherein the air supply chamber is divided into a plurality of parts corresponding to the plurality of burner groups, and only a part of the air supply chamber corresponding to a burning burner group comprises an air supply changeover mechanism for supplying air from the air supply fan.

According to the present invention, since the air sent from the air supply fan is supplied to only a part of the air supply chamber corresponding to a burning burner group by the air supply changeover mechanism, the air sent from the air supply fan is not supplied to a part of the air supply chamber corresponding to a non-burning burner group. Therefore, unlike the conventional example, a phenomenon does not occur that air is supplied to a non-burning burner group, the air is mixed with combustion exhaust gas in the upper part of the combustion housing, and thereby the temperature of combustion exhaust gas is decreased. Therefore, even if the combustion capacity is decreased by the capacity changeover mechanism, combustion exhaust gas having a high temperature can be discharged to the exhaust duct, so that the draft force can be kept high. As a result, the pressure in the exhaust duct becomes negative, so that combustion exhaust gas can be prevented from leaking from an intermediate portion of the exhaust duct even if the exhaust opening of the water heater is connected to a low gastight exhaust duct.

Also, unlike the conventional example, heat is not absorbed by the contact of the heat exchanger in the combustion housing with the air passing through a non-burning burner group, so that the heat efficiency can be improved. Even if the combustion capacity is decreased by the capacity changeover mechanism, the temperature of combustion exhaust gas can be kept high, so that the occurrence of drain caused by the condensation of water vapor in the combustion exhaust gas can be prevented.

In the case where the number of air supply fans is one, the air supply changeover mechanism can be configured by a plurality of distribution paths for individually guiding the combustion air sent from the air supply fan to the plurality of parts of the air supply chamber, regulating valves interposed in the distribution paths, and a controller which opens only a regulating valve interposed in a distribution path communicating with a part of the air supply chamber corresponding to a burning burner group.

Also, in the case where a plurality of air supply fans are provided so as to individually communicate with the plurality of parts of the air supply chamber, the air supply changeover mechanism can be configured by the air supply fans and a controller which drives an air supply fan communicating with a part of the air supply chamber corresponding to a burning burner group and prohibits an air supply fan communicating with a part of the air supply chamber corresponding to a non-burning burner group from driving or weakly drives that air supply fan. The term "weak drive" means a weak drive for preventing the combustion exhaust gas of a burning burner group from being discharged to the outdoors via a part of the air supply chamber corresponding to a non-burning burner group and an air supply fan communicating with that part of the air supply chamber.

DETAILED DESCRIPTION OF THE PREFERRED EMBODIMENTS

Figure 1:
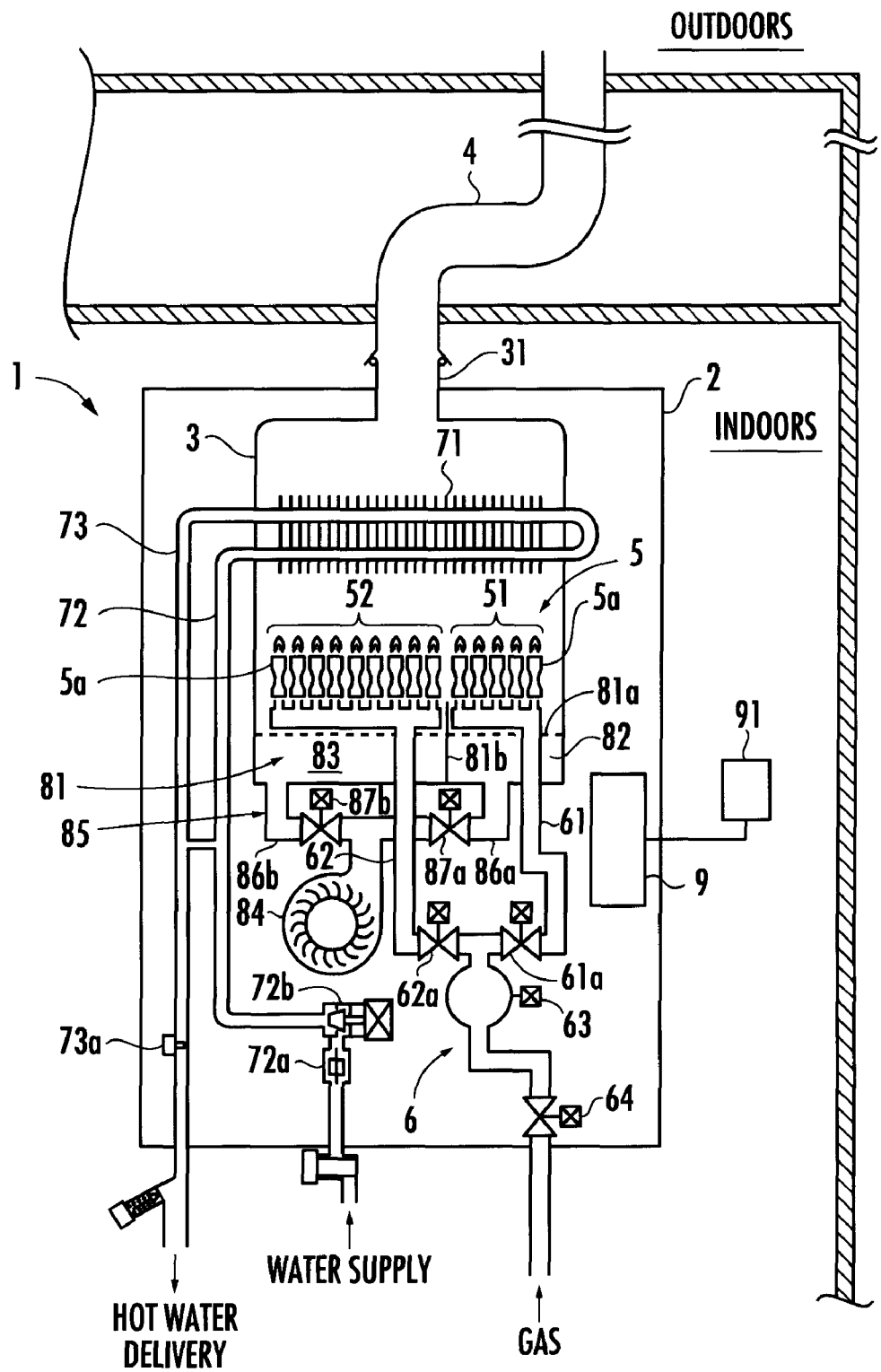
FIG. 1 is an explanatory view showing a first embodiment of a water heater in accordance with the present invention.

A water heater 1 of a first embodiment in accordance with the present invention shown in FIG. 1 is mounted indoors, and comprises a combustion housing 3 stored in a housing 2. At the upper end of the combustion housing 3, an exhaust opening 31 connected to an exhaust duct 4 extending to the outdoors is provided so as to be exposed above the housing 2. The exhaust duct 4 is formed by connecting a plurality of cylinder bodies, so that the gastightness depends on the sealing ability of the connecting part.

In the lower part of the combustion housing 3, a burner unit 5 is stored. The burner unit 5 is made up of a first burner group 51 formed by a relatively small number of unit burners 5a and a second burner group 52 formed by a relatively large number of unit burners 5a.

The burner unit 5 is connected with a gas supply path 6 for supplying fuel gas. The downstream side of the gas supply path 6 branches into a first branch path 61 connected to the first burner group 51 and a second branch path 62 connected to the second burner group 52. In the first branch path 61, a first capacity switching valve 61a for changing over the supply/shutoff of fuel gas sent to the first burner group 51 is interposed, and in the second branch path 62, a second capacity switching valve 62a for changing over the supply/shutoff of fuel gas sent to the second burner group 52 is interposed. Also, in the gas supply path 6, a gas proportional valve 63 is interposed so as to be positioned on the upstream side of the first branch path 61 and the second branch path 62, and a gas main valve 64 is interposed so as to be positioned on the upstream side of the gas proportional valve 63.

In the upper part of the combustion housing 3, a heat exchanger 71 for supplying hot water, which is heated by the burner unit 5, is stored. The heat exchanger 71 is connected with a water supply path 72 on the upstream side and a hot water delivery path 73 on the downstream side. Water is supplied to the heat exchanger 71 through the water supply path 72, and hot water heated by the heat exchanger 71 is delivered to the hot water delivery path 73. The water supplied to the heat exchanger 71 via the water supply path 72 is not limited to tap water, and may be, for example, water in a hot water tank, not shown. In this case, for example, the water heater 1 is arranged at the side of the hot water tank, the water in the lower part of the hot water tank is supplied to the heat exchanger 71 via the water supply path 72, and the hot water heated by the heat exchanger 71 is returned to the upper part of the hot water tank.

On the lower side of the arrangement section of the burner unit 5 in the combustion housing 3, an air supply chamber 81 that is divided from the arrangement section of the burner unit 5 with a distribution plate 81a having a large number of vent holes is provided. The air supply chamber 81 is divided into two chambers by a partition plate 81b, by which a first air supply chamber 82 corresponding to the first burner group 51 and a second air supply chamber 83 corresponding to the second burner group 52 are defined.

Under the combustion housing 3, one air supply fan 84 is provided. The air supply fan 84 supplies combustion air to the air supply chamber 81 via an air supply path 85. The downstream side of the air supply path 85 is branched into a first distribution path 86a connected to the first air supply chamber 82 and a second distribution path 86b connected to the second air supply chamber 83. In the first distribution path 86a, a first regulating valve 87a is interposed, and in the second distribution path 86b, a second regulating valve 87b is interposed.

A controller 9 is provided in the housing 2. The controller 9 can change over the combustion capacity to three states of a high capacity state, a medium capacity state, and a low capacity state. In the high capacity state, the first capacity switching valve 61a and the second capacity switching valve 62a are opened to burn the first burner group 51 and the second burner group 52. In the medium capacity state, the second capacity switching valve 62a is opened and the first capacity switching valve 61a is closed to burn the second burner group 52 only. In the low capacity state, the first capacity switching valve 61a is opened and the second capacity switching valve 62a is closed to burn the first burner group 51 only. That is to say, in the first embodiment, the first burner group 51 and the second burner group 52, the first branch path 61 and the second branch path 62, the first capacity switching valve 61a and the second capacity switching valve 62a, and the controller 9 constitute a capacity changeover mechanism of the present invention.

When water flow is detected by a water flow sensor 72a interposed in the water supply path 72, the controller 9 opens the gas main valve 64 to ignite and burn the burner unit 5, and also controls the gas proportional valve 63, the first capacity switching valve 61a, and the second capacity switching valve 62a so that the hot water delivery temperature detected by a temperature sensor 73a provided in the hot water delivery path 73 is a set temperature set by a remote control 91.

In the case where the hot water delivery temperature does not rise to the set temperature even if the burner unit 5 is burned at the maximum combustion rate in the high capacity state, the controller 9 carries out control to decrease the water flow rate by using a water flow rate regulating valve 72b interposed in the water supply path 72.

The controller 9 supplies combustion air to the burner unit 5 so that the quantity of combustion air corresponds to the combustion rate of burner unit 5 by driving the air supply fan 84. Also, the controller 9 opens the first regulating valve 87a and the second regulating valve 87b when the first burner group 51 and the second burner group 52 are burned, opens the second regulating valve 87b only and closes the first regulating valve 87a when the second burner group 52 only is burned, and opens the first regulating valve 87a only and closes the second regulating valve 87b when the first burner group 51 only is burned.

Thereby, the air sent from the air supply fan 84 is supplied to only the first air supply chamber 82 when the first burner group 51 only is burned, and is supplied to only the second air supply chamber 83 when the second burner group 52 only is burned. Therefore, a phenomenon does not occur that some of the combustion air supplied to the burner unit 5 by the air supply fan 84 passes through a non-burning burner group and is mixed with the combustion exhaust gas of a burning burner group in the upper part of the combustion housing 3, and thereby the temperature of combustion exhaust gas is decreased. Therefore, combustion exhaust gas having a high temperature can be caused to flow in the exhaust duct 4, so that a strong draft force can be maintained. As a result, the pressure in the exhaust duct 4 becomes negative, so that combustion exhaust gas can be prevented from leaking from an intermediate portion of the exhaust duct 4 even if the exhaust opening 31 of the water heater 1 is connected to a low gastight exhaust duct 4.

Also, unlike the conventional example, heat is not absorbed by the contact of the heat exchanger 71 in the combustion housing 3 with the air passing through a non-burning burner group, so that the heat efficiency can be improved. Even in the state of a low combustion capacity, the temperature of combustion exhaust gas can be kept high, so that the occurrence of drain caused by the condensation of water vapor in the combustion exhaust gas can be prevented.

In the water heater 1 of the first embodiment, the first distribution path 86a and the second distribution path 86b, the first regulating valve 87a and the second regulating valve 87b, and the controller 9 constitute an air supply changeover mechanism of the present invention.

Figure 2:
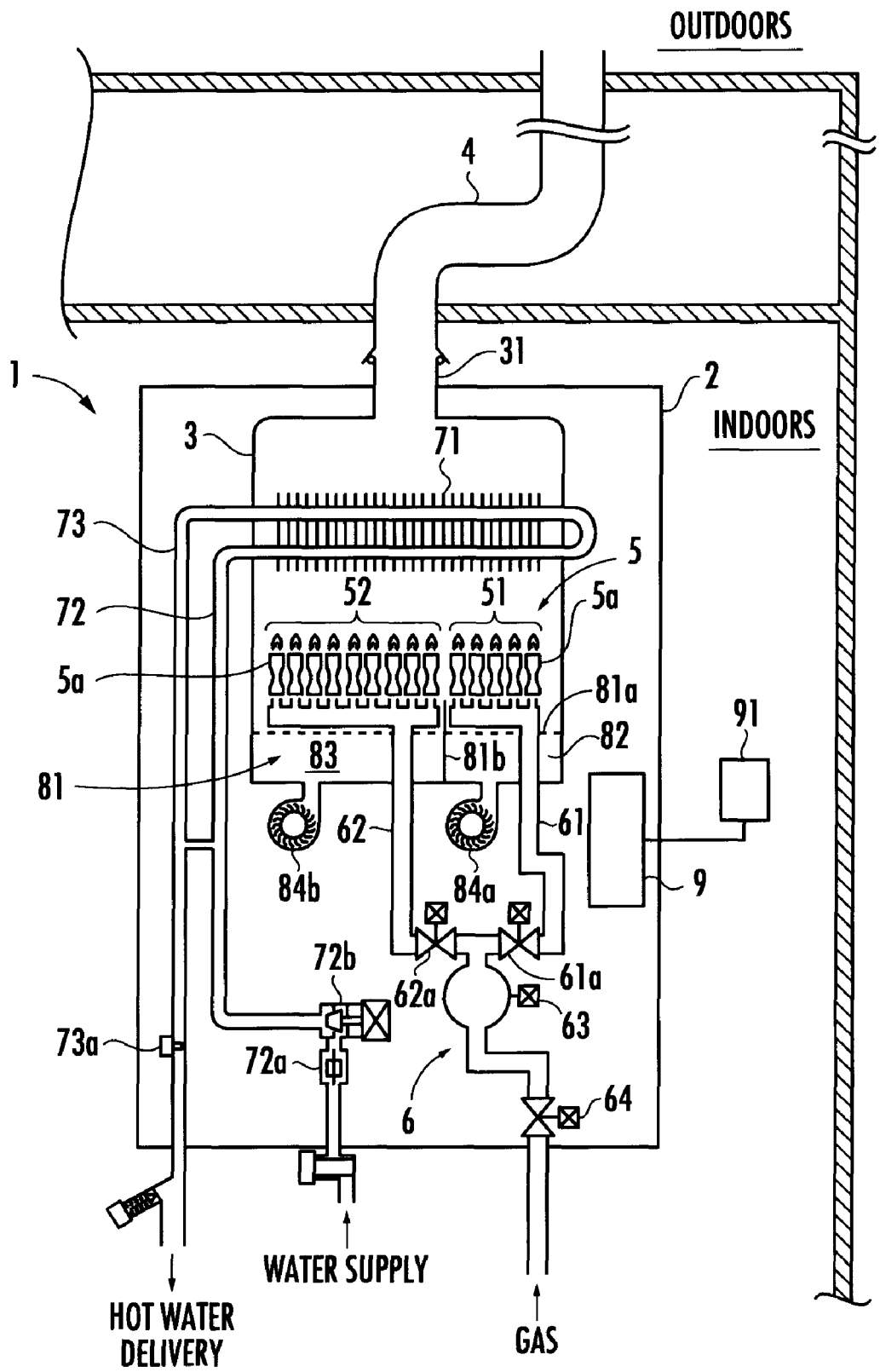
FIG. 2 is an explanatory view showing a second embodiment of a water heater in accordance with the present invention.

Next, a second embodiment of the water heater in accordance with the present invention is explained with reference to FIG. 2. In the second embodiment, the same symbols are applied to the same elements as those in the first embodiment. The water heater 1 of the second embodiment comprises a first air supply fan 84a that communicates with the first air supply chamber 82 to supply combustion air to the first burner group 51 and a second air supply fan 84b that communicates with the second air supply chamber 83 to supply combustion air to the second burner group 52 in place of the air supply fan 84, the air supply path 85, the first regulating valve 87a, and the second regulating valve 87b in the water heater 1 of the first embodiment. Other configurations are the same as those of the water heater 1 of the first embodiment.

The controller 9 of the water heater 1 of the second embodiment drives the first air supply fan 84a and the second air supply fan 84b when the first burner group 51 and the second burner group 52 are burned, drives the second air supply fan 84b and prohibits the first air supply fan 84a from driving or weakly drives the first air supply fan 84a when the second burner group 52 only is burned, and drives the first air supply fan 84a and prohibits the second air supply fan 84b from driving or weakly drives the second air supply fan 84b when the first burner group 51 only is burned.

The term "weak drive" means a weak drive for preventing the combustion exhaust gas of a burning burner group from being discharged to the outdoors via a part (the first air supply chamber 82 or the second air supply chamber 83) of the air supply chamber 81 corresponding to a non-burning burner group and an air supply fan (the first air supply fan 84a or the second air supply fan 84b) communicating with that part of the air supply chamber 81.

When either one burner group only of the first burner group 51 and the second burner group 52 is burning, if an air supply fan communicating with a part of the air supply chamber 81 corresponding to the other non-burning burner group is weakly driven by the controller 9, the combustion exhaust gas of the burning burner group can be prevented from being discharged to the outdoors passing through the part of the air supply chamber 81 corresponding to the non-burning burner group and the air supply fan communicating with that part of the air supply chamber 81. In the second embodiment, the first air supply fan 84a, the second air supply fan 84b, and the controller 9 constitute an air supply changeover mechanism of the present invention.

In the water heater 1 of the second embodiment as well, like the water heater 1 of the first embodiment, even if the combustion capacity is decreased, the temperature of combustion exhaust gas can be kept high, and even if the exhaust opening 31 is connected to a low gastight exhaust duct 4, combustion exhaust gas can be prevented from leaking from an intermediate portion of the exhaust duct 4. Also, the heat efficiency can be improved, and the occurrence of drain can be prevented.

In the above-described embodiments, the water heater 1 comprising the burner unit 5 made up of the first burner group 51 formed by a relatively small number of unit burners 5a and the second burner group 52 formed by a relatively large number of unit burners 5a is applied to the present invention. However, the configuration of the burner unit 5 is not limited to this configuration. For example, a water heater comprising a burner unit made up of two burner groups each formed by the same number of unit burners or a water heater comprising a burner unit made up of three or more burner groups can also be applied similarly to the present invention.

What is claimed is:

1. A water heater comprising:
a combustion housing having an exhaust opening at an upper end thereof, which is connected to an exhaust duct extending to outdoors;
a burner unit which is stored in a lower part of the combustion housing and made up of a plurality of burner groups;
a heat exchanger for hot water supply which is stored in an upper part of the combustion housing;
an air supply fan for supplying combustion air to the burner unit via an air supply chamber provided on a lower side of an arrangement section of the burner unit in the combustion housing; and
a capacity changeover mechanism for changing over combustion capacity by changing the number of burner groups to be burned,
wherein the air supply chamber is divided into a plurality of parts corresponding to the plurality of burner groups, and comprises an air supply changeover mechanism for supplying air from the air supply fan to only a part of the air supply chamber corresponding to a burning burner group.

2. The water heater according to claim 1, wherein the number of air supply fans is one, and the air supply changeover mechanism is configured by a plurality of distribution paths for individually guiding the combustion air sent from the air supply fan to the plurality of parts of the air supply chamber; a plurality of regulating valves interposed in each of the distribution path; and a controller which opens only a regulating valve interposed in a distribution path communicating with a part of the air supply chamber corresponding to a burning burner group.

3. The water heater according to claim 1, wherein the air supply changeover mechanism is configured by a plurality of air supply fans provided so as to individually communicate with the plurality of parts of the air supply chamber, and a controller which drives an air supply fan communicating with a part of the air supply chamber corresponding to a burning burner group and prohibits or weakly drives an air supply fan communicating with a part of the air supply chamber corresponding to a non-burning burner group from driving.

4. A water heater comprising:
a combustion housing having an exhaust opening at an upper end thereof, the exhaust opening connected to an exhaust duct extending to outdoors;
a burner unit stored in a lower part of the combustion housing and made up of a plurality of burner groups;
a single air supply fan for supplying combustion air to the burner unit;
an air supply chamber defining a plurality of distribution paths, each of the plurality of distribution paths communicating combustion air from the single air supply fan to a unique one of the plurality of burner groups;

a capacity changeover mechanism configured to change combustion capacity by changing the number of burner groups to be burned; and an air supply changeover mechanism configured to supply combustion air to only those distribution paths from among the plurality of distribution paths which communicate combustion air to those burner groups being burned.

5. The water heater according to claim 4, wherein the air supply changeover mechanism comprises:

a plurality of independently operable regulating valves, each of which is interposed in a unique one of the plurality of distribution paths; and a controller configured to open only those regulating valves which are interposed in a distribution path communicating with a burner group being burned.

6. The water heater according to claim 5, further comprising:

a heat exchanger for hot water supply which is stored in an upper part of the combustion housing.

7. The water heater according to claim 4, further comprising:

a heat exchanger for hot water supply which is stored in an upper part of the combustion housing.

* * * * *